(12) United States Patent
Jung et al.

(10) Patent No.: US 10,852,952 B1
(45) Date of Patent: Dec. 1, 2020

(54) REDUCING I/O DELAYS ASSOCIATED WITH SNAPSHOTS USING HINTS

(71) Applicant: EMC IP Holding Company LLC, Hopkinton, MA (US)

(72) Inventors: Jaeyoo Jung, Shrewsbury, MA (US); Michael Ferrari, Douglas, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/519,303

(22) Filed: Jul. 23, 2019

(51) Int. Cl.
*G06F 3/06* (2006.01)
*G06F 11/14* (2006.01)

(52) U.S. Cl.
CPC ............ *G06F 3/0611* (2013.01); *G06F 3/065* (2013.01); *G06F 3/0673* (2013.01); *G06F 11/1469* (2013.01)

(58) Field of Classification Search
CPC ........ G06F 3/0611; G06F 3/061; G06F 3/065; G06F 3/0673; G06F 11/1469
See application file for complete search history.

(56) References Cited

U.S. PATENT DOCUMENTS 10,101,918 B2 * 10/2018 Hahn ...................... G06F 3/064
10,318,495 B2 * 6/2019 Talagala .............. G06F 11/1471

OTHER PUBLICATIONS

DellEMC, "Dell EMC Timefinder SnapVX Local Replication Technical Note," TimeFinder SnapVX, Clone, VP Snap, and Mirror, May 2018.

* cited by examiner

*Primary Examiner* — Idriss N Alrobaye
*Assistant Examiner* — Richard B Franklin
(74) *Attorney, Agent, or Firm* — Muirhead and Saturnelli, LLC

(57) ABSTRACT

Techniques for processing I/O operations may include: selecting a logical device having at least one snapshot on a data storage system; sending, from a host to the data storage system, a first hint for a first write I/O operation directed to a first location on the logical device, wherein said sending the first hint is performed prior to the host sending the first write I/O operation to the data storage system; and responsive to receiving the first hint regarding the first write I/O operation to the first location of the logical device having at least one snapshot, performing preprocessing for the first write I/O operation. Hints may also be sent for I/O operations directed to a target device linked to a snapshot of the logical device. The data storage system may perform preprocessing for the I/O operations directed to the target device linked to the snapshot.

24 Claims, 15 Drawing Sheets

REDUCING I/O DELAYS ASSOCIATED WITH SNAPSHOTS USING HINTS

BACKGROUND

Technical Field

This application generally relates to snapshots and reducing delays of I/O operations.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

An application may execute on a host where the application performs I/O (input/output) operations. The host may be able to transmit the data operation to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

Embodiments of the techniques herein include a method, computer readable medium and system for processing I/O operations comprising: selecting a logical device having at least one snapshot on a data storage system; sending, from a host to the data storage system, a first hint for a first write I/O operation directed to a first location on the logical device, wherein said sending the first hint is performed prior to the host sending the first write I/O operation to the data storage system; and responsive to receiving the first hint regarding the first write I/O operation to the first location of the logical device having at least one snapshot, performing preprocessing for the first write I/O operation. First data may be stored at the first location of the logical device, and a first snapshot of the logical device may reference the first data. The preprocessing for the first write I/O operation may include allocating a new storage portion; copying the first data to the new storage location; and updating the first snapshot to reference the new storage location.

In at least one embodiment, the method may include sending the first write I/O operation from the host to the data storage system after sending the first hint from the host to the data storage system. The first write I/O operation may write second data, and responsive to receiving the first write I/O operation, the processing performed may include storing the second data at the first location of the logical device.

In at least one embodiment, the first snapshot may be linked to a second logical device exposed to the host. Processing may include sending, from the host to the data storage system, a second hint for a second I/O operation directed to a second location on the second logical device, wherein said sending the second hint is performed prior to the host sending the second/O operation to the data storage system; and responsive to receiving the second hint regarding the second I/O operation to the second location of the second logical device linked to the first snapshot, performing second preprocessing for the second I/O operation. The second I/O operation may any of a read and write operation.

In at least one embodiment, a structure associated with the second logical device may include a plurality of entries for a plurality of corresponding logical locations of the second logical device. The structure may reference data stored at the logical locations of the second logical device. The second preprocessing for the second I/O operation may include determining a first entry of the table corresponding to the second location of the second logical device; and updating the first entry of the table to reference data currently stored at the second location of the second logical device. Updating may include determining whether data of the second location of the second logical device is located on the logical device or a storage location in a storage pool. Each of the second logical device and the logical device may be a different thin logical device that is virtually provisioned. Updating may include determining whether allocated storage is associated with the second location of the second logical device; and responsive to determining that allocated storage is not associated with the second location of the second logical device, updating the first entry to denote a null value as a reference to data stored at the second location of the second logical device. The second I/O operation may be sent from the host to the data storage system after sending the second hint from the host to the data storage system. The second I/O operation may write new data to the second location of the second logical device. Responsive to receiving the second I/O operation, first processing may be performed that stores the new data at the second location of the second logical device. The second I/O operation may read data from the second location of the second logical device. Responsive to receiving the second I/O operation, first processing may be performed that reads current data stored at the second location of the second logical device. Processing may include determining that the logical device, having at least one snapshot on the data storage system, has a current I/O response time that has increased relative to a second I/O response time for I/Os directed to the logical device when the logical device had no associated snapshots. The host may send I/Os to a plurality of front end directors of the data storage system and the first hint may be sent to a first of the plurality of front end directors. The first front end director may have a lowest relative workload of the plurality of front end directors. The host may determine relative workloads of the plurality of front end directors in accordance with outstanding or pending I/Os issued from the host to the plurality of front end directors.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
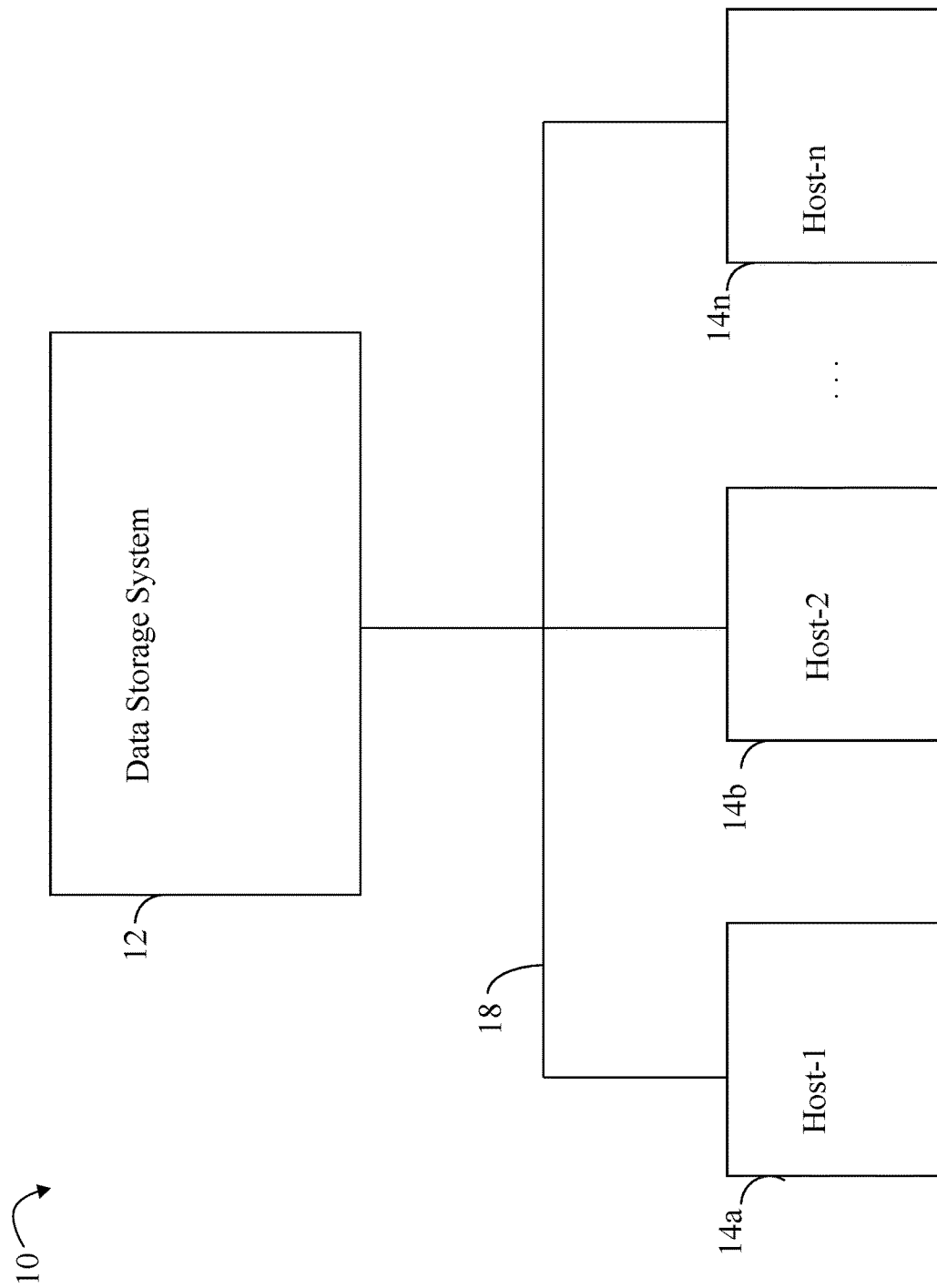
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, NVMe (Non-Volatile Memory Express) over Fabrics, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
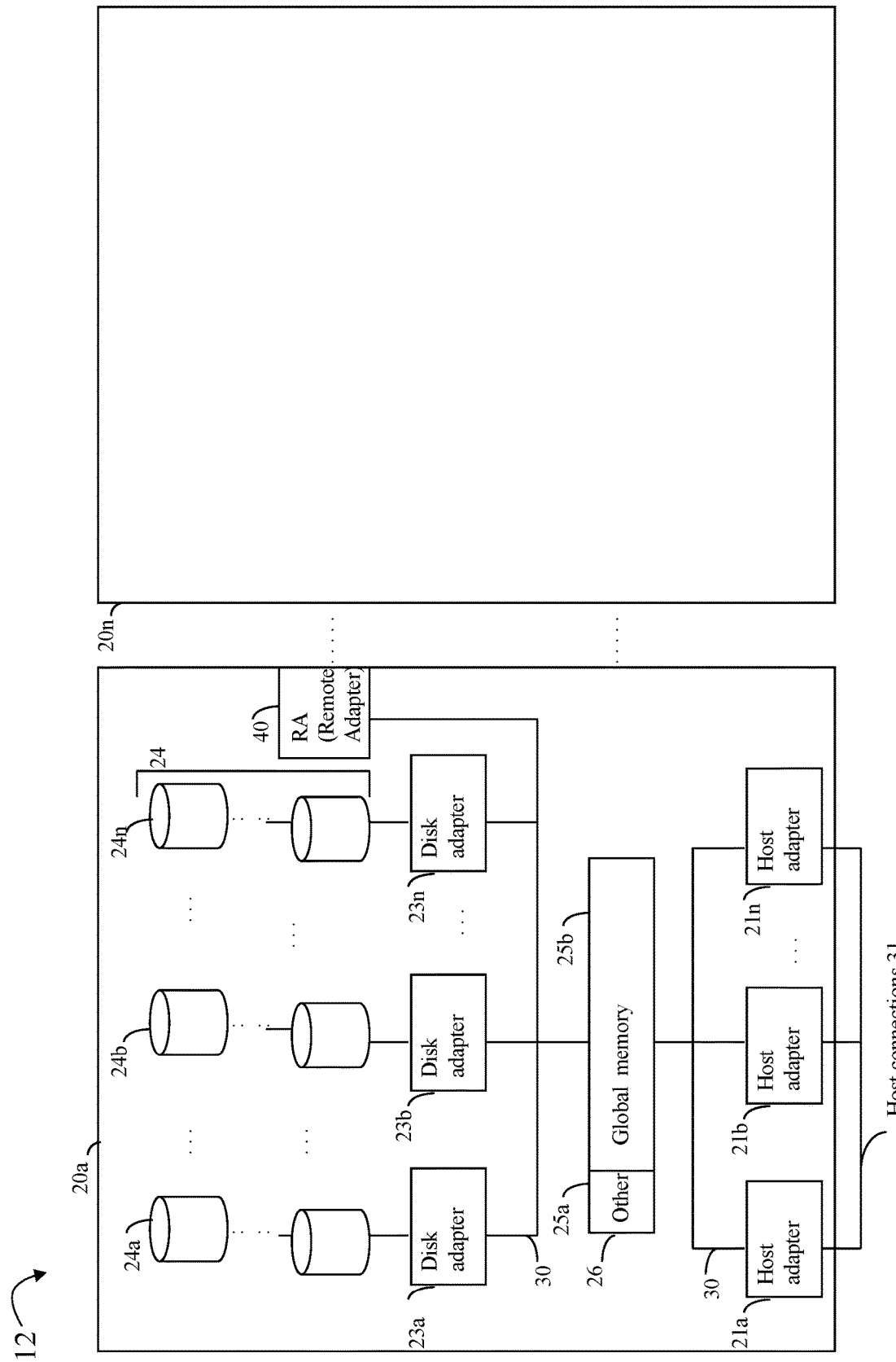
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices (e.g., SLC (single level cell) flash, MLC (multi-level cell) flash, TLC, (tri-level cell) flash) or more generally solid state drives (SSDs), and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host (e.g., receive host I/O commands and send responses to the host) may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA physically accesses the back-end non-volatile storage devices, such as physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as the non-volatile physical storage device (PDs of 24) accessed by a DA. In connection with reads, processing may include first looking to see if the requested read data is in cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

I/O response time may be characterized as the amount of time it takes the data storage system to perform or service an I/O operation from start to finish. Upon completion of the servicing, an acknowledgement regarding the I/O completion may be returned to the host or other client that issued the I/O operation. I/O response time may be measured from one or more component perspectives. I/O response time may be measured from the host perspective in which it may denote the amount of time that has lapsed from a starting point when the host issued the I/O operation to the data storage system to an ending point when the host received an acknowledgement from the data storage system. I/O response time may be measured from the data storage system perspective in which it may denote the amount of time that has lapsed from a starting point when the I/O operation is received at the data storage system to an ending point when the data storage system transmits an acknowledgement regarding I/O operation completion to the host.

Figure 2B:
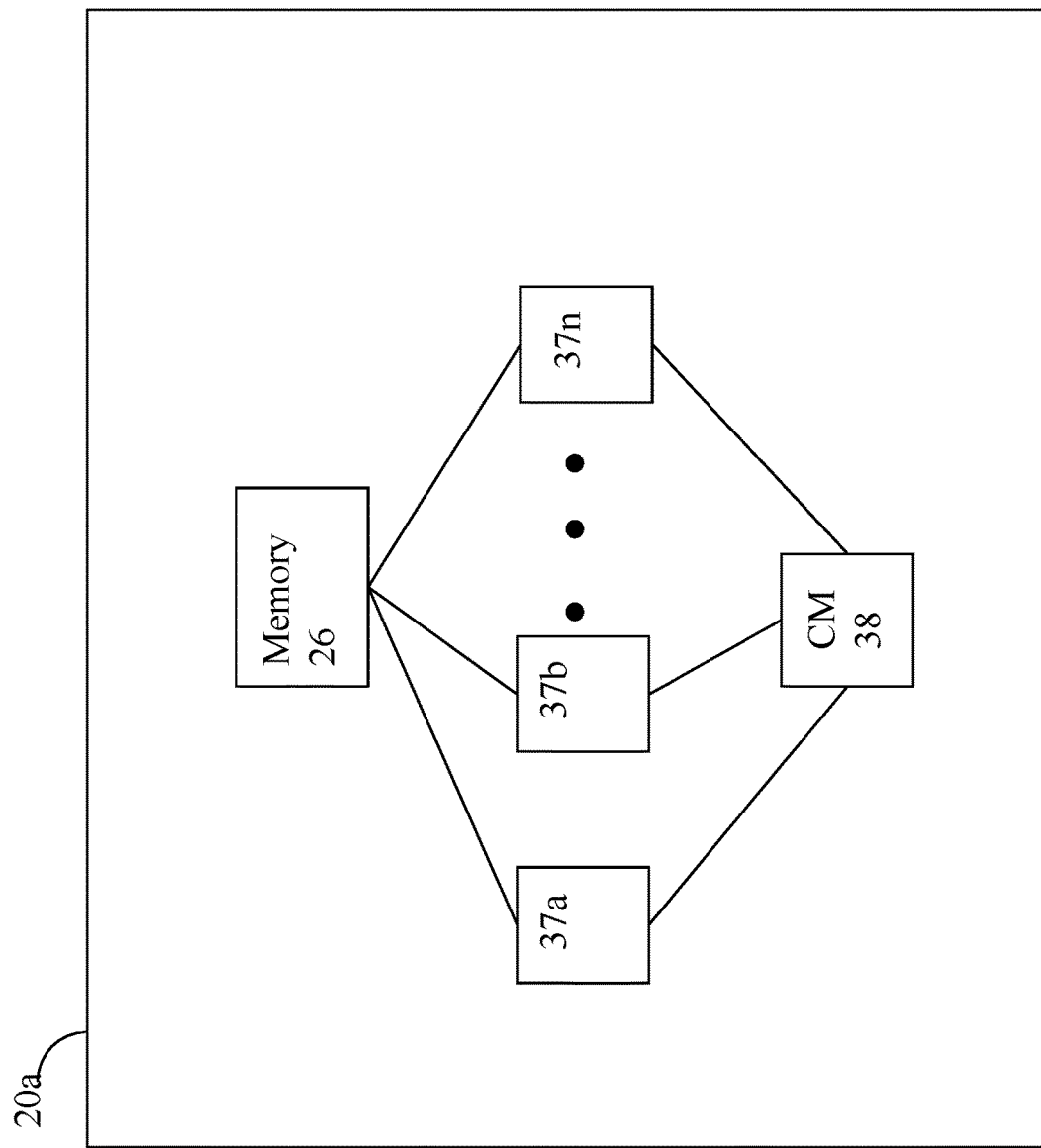
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data storage system may provide various data services. For example, in at least one embodiment in accordance with the techniques herein, a data storage system may provide different data replication technologies, facilities or services. Such replication technologies may be characterized as local or remote. Additionally, a replication technology may provide for creating a complete, physical bit for bit copy or replica of data (that is local and/or remote). A replication technology may provide for creating a logical or virtual point in time copy of a data source such as using a snapshot technology or facility known in the art. Such logical copies of a data source are not a complete physical copy of the data source. Rather, different techniques such as a snapshot technique may be used to create a logical or virtual copy of the data source. For example, a snapshot facility may be used in an embodiment in accordance with techniques herein to create a snapshot characterized as a logical point in time copy of data. In connection with a logical device, or more generally any storage entity, software of a data storage system may provide one or more data replication services or facilities whereby a snapshot is one such facility that may be used to create point in time snapshot of a logical device such as a LUN for non-disruptive backup. A snapshot may appear like a normal logical device and may be used for backup, testing, and the like.

Snapshots may rely, for example, on copy on first write (COFW) and other techniques to track source logical device changes from the time when a snapshot was created. Any writes to the source logical device may result in processing by snapshot software, for example, to copy the original data prior to changes into another area of storage before overwriting the source logical device location with the newly written data (e.g., original data is copied/written to a new location). With respect to COFW techniques, the COFW occurs only once for each data block modified on the source device. Since only changed data blocks of the source device are retained rather than make a complete copy of the source device, the storage capacity required to implement snapshots may be considerably less than that of the source device. Though a snapshot of a source logical device may be presented to a user as a separate logical device along with the current source logical device, a snapshot of the source logical device is a virtual point in time copy and requires access to the unchanged data in the source logical device. Therefore failures affecting the source logical device also affect the snapshot of the source logical device. Snapshots of a source logical device may be contrasted, for example, with the physically complete bit-for-bit replicas of the source logical device.

In connection with the foregoing, COFW is only one example of a technology or a technique that may be used in connection with snapshots. More generally, any suitable technique may be used in connection with snapshot creation and techniques described herein. As another example, redirect on Write (ROW) is another technique that may be used in connection with a snapshot implementation. With ROW, after a snapshot is taken, new writes to the primary or source logical device are redirected (written) to a new location.

In at least one embodiment in accordance with techniques herein, the snapshot facility may be TimeFinder® SnapVX™ by Dell Inc. using the COFW or ROW techniques as noted above. With ROW, when a source volume or logical device is written to and the original data of the source volume or logical device needs to be preserved for a snapshot(s), the new write is accepted and asynchronously written to a new location. The source volume now points to the new data while the snapshot(s) continue to point to the original data (e.g., the snapshot delta) in its original location. For example, U.S. patent application Ser. No. 15/969,048, filed May 2, 2018, "Efficient Snapshot Activation", Chandrashekhara, which is incorporated by reference herein in its entirety, describes in more detail processing that may be performed in at least one embodiment in connection with establishing or creating a targetless snapshot as well as a linked snapshot (e.g., linked to a logical device identifier), processing performed in connection with servicing I/O operations directed to the snapshot and source logical device, and other processing. Targetless snapshots and linked snapshots (e.g., where a targetless snapshot is linked or bound to a logical device identifier and this exposed as a logical device for use by a host or other client) are described in more detail elsewhere herein.

A data storage system may provide support for one or more types of logical devices or LUNs. The techniques herein may be used in an embodiment having thin or virtually provisioned logical devices. A thin logical device or LUN is a type of logical device where units of storage are progressively allocated on an as-needed basis. Typically, the base units of storage are provisioned from multiple sets of PDs organized as RAID groups, where these groups are partitioned into small portions sometimes referred to as slices. There is a mapping provided to relate the logical address in a thin device to the particular slice of provisioned storage. In a system using thin provisioning, the thin devices may appear to a host coupled to a data storage array as one or more logical volumes (logical devices) containing contiguous blocks of data storage. A thin device may be virtually provisioned in terms of its allocated physical storage where physical storage for a thin device (presented to a host as having a particular capacity) is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated. In some embodiments, storage associated with a particular subrange of the logical address space of a thin device (where the subrange may be the size of a slice or chunk allocation unit) may be initially allocated in response to the first time there is write to the logical address subrange. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

An embodiment in accordance with techniques herein may provide for logical devices that are thin or virtually provisioned devices along with thick logical devices. A thick device or LUN may be characterized as a regular logical device presented as having a particular storage capacity where physical storage is provisioned (allocated or bound) for the entire storage capacity when the thick device is configured.

In at least one embodiment in accordance with the techniques herein, a point-in-time snapshot of a LUN can be accessed by a client, such as a host, by linking the snapshot to a host accessible logical device or volume sometimes referred to herein as a target logical device or volume. The foregoing relationship or connection between a snapshot and a target logical device may be established using a command such as a link or bind command. In such an embodiment, the snapshot may be linked (e.g., via execution of a bind or a link command) to a target logical device or LUN that is further exposed or made available to a file server, the host, or other data storage system client where the target logical device or LUN is also a thin LUN (TLU). In such an embodiment, the relationship between a snapshot and a linked target device may be broken using a command such as unbind or unlink. In following paragraphs, the techniques herein may use a TLU in examples. For example, in at least one embodiment, the source logical device may be a TLU and the snapshot of the source logical device may be linked to a TLU. However, more generally, any suitable LUN or logical device may be used.

In at least one embodiment, a targetless snapshot may be created which results in a logical point in time copy of the source or primary device. The snapshot may be characterized as targetless in that it is not linked to target volume (e.g., not exposed or exported out of the data storage system to a host or other client). As noted above, a targetless snapshot may be linked to a target volume or logical device that is presented to the host or other client so that the client may access data of the snapshot, such as perform read and/or write requests, with respect to the target volume. Targetless snapshots may be taken at desired points in time to provide logical point in time copies of the source logical devices for any suitable purpose. For example, such multiple targetless snapshots may be taken on demand, and/or at predefined points in time in accordance with a defined replication schedule. At a later point in time after the multiple targetless snapshots are created, a user may, for example, select one of the targetless snapshots, and then link the selected targetless snapshot to a target logical device or volume which is then exposed to a host or other client for I/O operations.

When one or more snapshots of a source logical device are created, there may be performance penalties or an adverse performance impact in connection with processing I/O operations directed to the source logical device and any linked snapshots of the source logical device. There may be an adverse impact to the source logical device in connection with write I/O operations directed to the source logical device. For example, in at least one embodiment in which COFW techniques are used, when a write I/O is directed to a target LBA of the source device, additional processing may be performed to save an existing copy of the data stored at the target LBA of the source device prior to overwriting the target LBA with the new write data. The existing data of the target LBA may be saved to a new storage location since the existing data may be used or referenced by a snapshot of the source device. The references or pointers of the snapshots are also updated to now reference the new storage location containing the existing data. Prior to the write to the source device, the target LBA of one or more snapshots of the source device may contain the same data as the target LBA of the source device, whereby the snapshots reference the data stored at the target LBA of the source device. However, after the write, the target LBA of the snapshots are updated to reference the new storage location. It should be noted that in an embodiment providing one or more snapshots using the ROW technique, additional processing may be performed that includes allocating a new storage location and writing the new write data to the new storage location, whereby the snapshots may continue to reference the existing data stored at its existing storage location prior to the write. Thus although COFW techniques for snapshots may generally result in larger additional I/O processing time as compared to ROW techniques for snapshots, both COFW and ROW techniques incur some additional processing and performance penalty in order to preserve the necessary data and maintain one or more snapshots of a source logical device. Such additional processing as just discussed may be performed in connection with processing the write I/O directed to the source device having one or more snapshots. Such additional processing may result in undesirable increased write I/O response time in order to preserve or maintain existing data stored on an LBA of a source device prior to overwriting the LBA of the source device with new data.

There may also be an adverse performance impact or performance penalty for processing read and write operations directed to a linked snapshot (e.g., where the snapshot is linked to a target logical device and thereby exposed to the host or client for I/O operations). As noted above, in at least one system, linking a snapshot to a logical device may trigger processing to be performed. Such processing may include define processing in which a table or other structure is initialized to reference the location of the data for the LBAs of the target device linked to the snapshot. It takes time to initialize the entire table or structure and determine the location of the data for all the LBAs of the target device. An I/O operation directed to an LBA of the target device linked to the snapshot may be received prior to initializing the table with the location of the data for the LBA of the I/O operation. In such a case, the response time for the I/O operation is increased since the location of the data for the LBA is then determined at runtime (e.g., as part of the I/O or data path) in order to process the I/O operation.

Described in following paragraphs are techniques that may be performed to reduce the I/O delays and adverse I/O response time performance impact when processing writes directed to a source logical device having one or more snapshots. Additionally, such techniques may include performing processing to reduce the I/O delays and adverse I/O response time performance impact when processing reads and writes directed to a linked snapshot or target device that is linked to a snapshot of a source logical device. In at least one embodiment, hints may be sent from the host to the data storage system. The hints may identify one or more LBAs of write I/O operations to the source logical device. The hints, identifying the LBAs of write I/O operations to the source logical device, may be issued to the data storage system in a "look ahead manner" prior to the data storage system receiving the actual write I/O operations. The data storage system may use the hints to perform preprocessing related to the one or more LBAs for the write I/O operations prior to receiving and/or prior to servicing the write I/O operations to such one or more LBAs. In this manner, the hints provide the data storage system with a "look ahead" at the subsequently expected write I/O operations directed to the one or more LBAs so that the data storage system can perform any desired preprocessing for the write I/O operations. The preprocessing may include performing steps to preserve or save the existing data stored at the one or more LBAs of the source device, where the existing data is referenced by one or more snapshots of the source device as data content stored on such one or more snapshots. The preprocessing may include allocating a new storage location, copying the existing data from the LBA of the source device to the new storage location, and updating any references by the one or more snapshots to refer to the new storage location rather than the LBA of the source device. When the write I/Os to the LBAs of the source device are received, the preprocessing noted above has already been performed in efforts to reduce the amount of processing performed as part of the data or I/O path when servicing the write I/Os. In this manner, I/O response time for the write I/Os may be reduced.

The hints may identify one or more LBAs of I/O operations directed to a target logical device linked to a snapshot of the source logical device. The hints, identifying the LBAs of I/O operations to the target logical device linked to a snapshot of the source logical device, may be issued to the data storage system in a "look ahead manner" prior to the data storage system receiving the actual I/O operations. The I/O operations may include read and/or write operations directed to the target logical device linked to the snapshot of the source device. The preprocessing may include performing define processing for the identified LBAs prior to the data storage system receiving I/Os directed to such identified LBAs of the linked target device. The preprocessing may include initializing the table or structure for the target logical device identifying the location of where data for the identified LBAs is located. In this manner, when the read or write I/O to the target device linked to the snapshot is received, the preprocessing noted above has already been performed in efforts to reduce the I/O response time for the I/O operation.

The foregoing and other aspects of the techniques herein are described in more detail in following paragraphs and figures.

Figure 3:
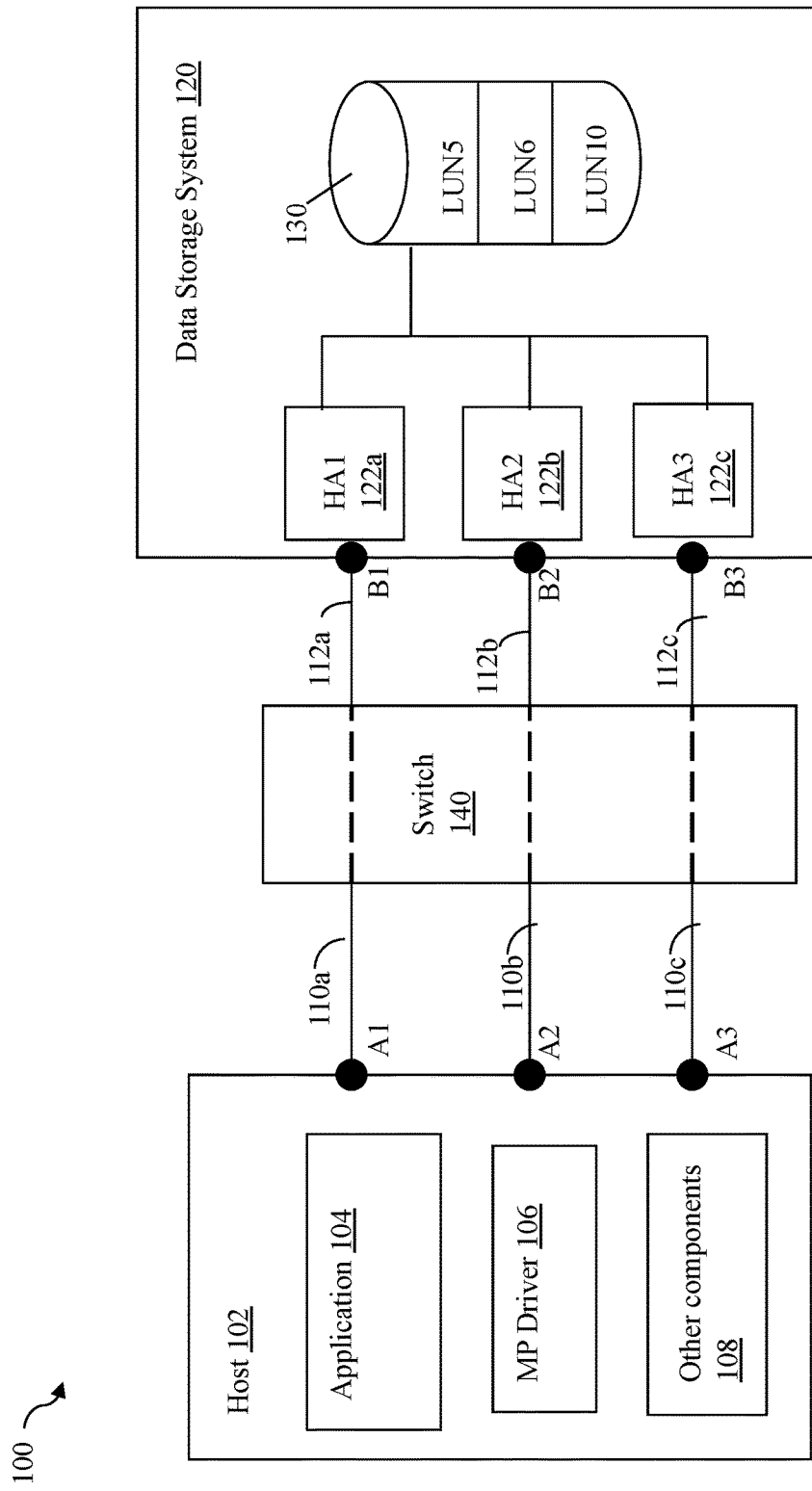
FIG. 3 is an example of systems and components that may be used in connection with the techniques herein.

Referring to FIG. 3, shown is an example of an embodiment of a system that may be utilized in connection with the techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs-LUN5, LUNG and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120.

Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for a LUN device across available active paths. Load balancing may be performed to provide for better resource utilization and increased performance of the host, data storage system, and network or other connection infrastructure. The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC or SCSI driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4A:
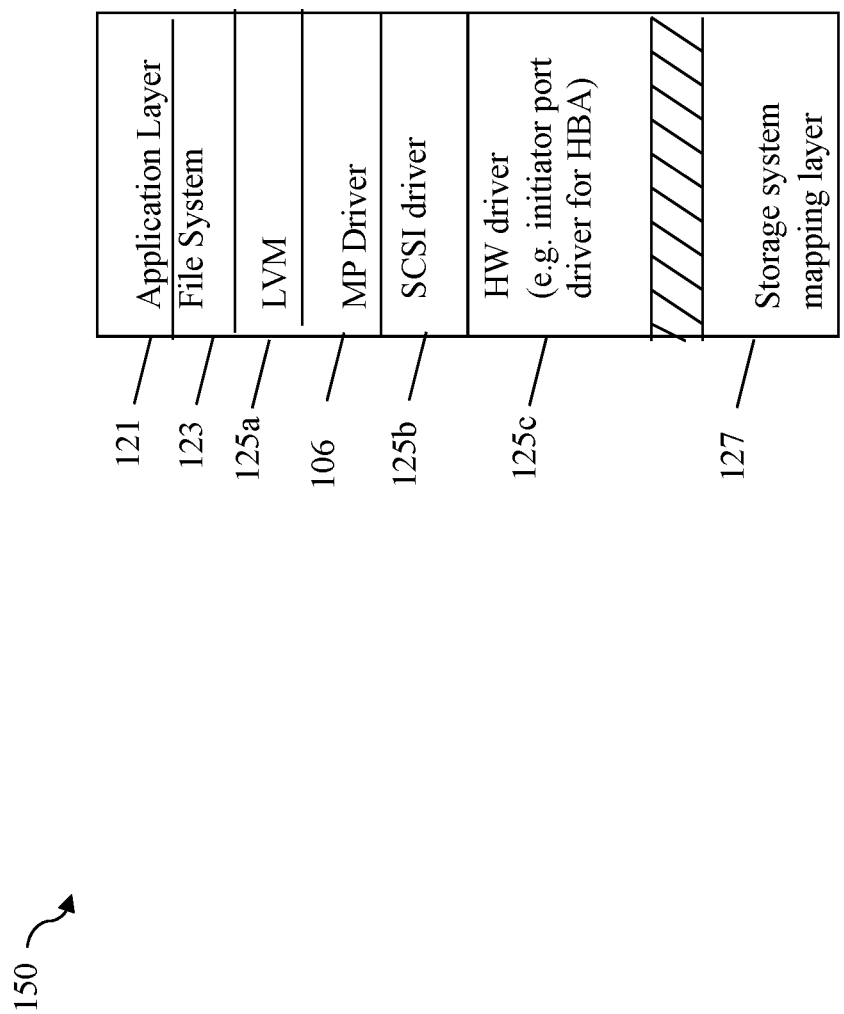
FIG. 4A is an example of different software layers that may be included in a host and data storage system in an embodiment in accordance with the techniques herein.

Referring to FIG. 4A, shown is a representation of a number of mapping layers that may be included in a computer system, such as host 102 of FIG. 3, in combination with a data storage system. FIG. 4A provides further detail regarding various software layers that may be used in connection with the MP driver 106 of FIG. 3.

In an embodiment in accordance with techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI driver 125b and a hardware (HW) driver 125c. The SCSI driver 125b may handle processing of a received I/O request from the MP driver 106 such as related to forming a request in accordance with the SCSI standard. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4A, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify an LBA within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In following paragraphs, an LBA of a LUN may be a single track for purposes of illustration of example. However, more generally, each track of a LUN may correspond to one or more LBAs, or each LBA may correspond to one or more tracks. More generally, an LBA or track may be a data portion of any suitable size used in an embodiment.

Figure 4B:
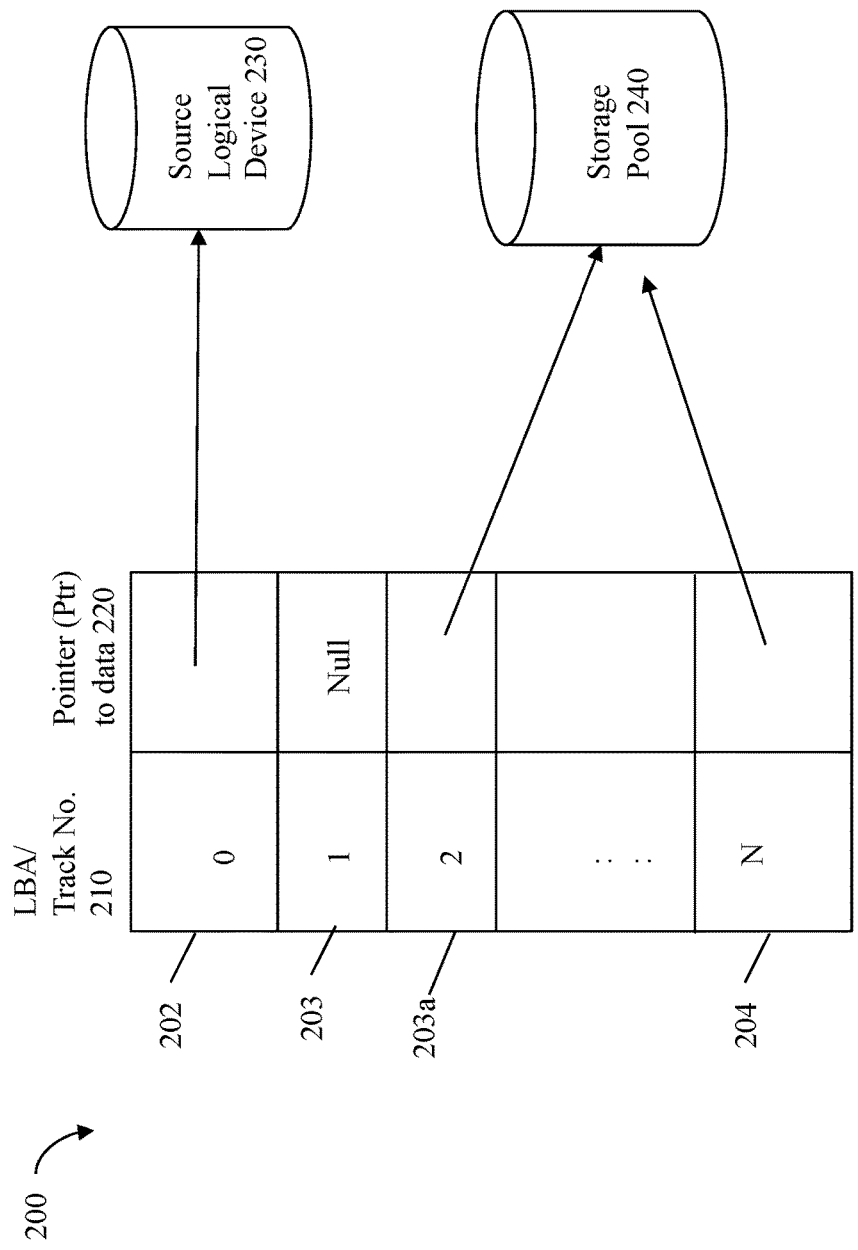
FIG. 4B is an example illustrating a table with references to data for data portions or tracks of a target device linked to a source logical device in an embodiment in accordance with the techniques herein.

Referring to FIG. 4B, shown is an example of a structure 200 that may be used for a LUN, such as a TLUN, in connection with the techniques herein. The structure 200 denotes a logical representation of information that may be used in connection with identifying the location of data for each track or LBA of the LUN. In connection with the techniques herein, the LUN may be a target device that is connected, bound or linked to a snapshot of a source LUN. The LUN that is the target device may be bound to a snapshot of the source LUN to expose the snapshot of the source LUN for use by the host. For example, the host may issue read and/or write I/Os to the snapshot of the source LUN exposed as the linked target device.

In at least one embodiment, a command may be issued, such as bind command, to bind the targetless snapshot of the source LUN as a target LUN exposed to the host. Responsive to receiving the bind command, in at least one embodiment, processing may be performed to initialize an instance of the table 200 for the target LUN. The table 200 may be used to determine the location of the data for each track of the snapshot exposed as the target LUN. For example, in at least one embodiment, the table 200 may include two columns of information—the LBA or track number (no.) column 210 and the pointer (ptr.) to data column 220. The example 200 denotes a LUN having a starting LBA or track number of 0 and a last LBA or track number N. Thus, the target LUN (e.g., linked to the snapshot of the source LUN) has N+1 LBAs or tracks in this example. The table 200 includes a unique entry for each LBA or track no. and identifies the location of the data for that LBA or track no. For example, entry 202 indicates that the ptr. in column 220 is used for identifying the storage location of the data for LBA or track 0 of the target LUN.

In at least one embodiment, the ptr value in column 220 for an entry in the table 200 may identify, or more generally reference, data of the source LUN 230 (e.g., where the source LUN track and the target LUN track include the same data), or may be a pointer to, or more generally reference, a storage location in the storage pool 240 identifying a different version of data than as currently stored on the source LUN. In at least one embodiment in which the snapshot of the source LUN is bound and exposed to the host as a target LUN, the ptr value in column 220 may also be null and not identify any location for data. Consistent with discussion herein, storage for a logical address of a LUN may be allocated on-demand on the first initial write to the logical address. As such, it may be that the source LUN and the linked target LUN (e.g., bound or linked to the snapshot of the source LUN) may have one or more LBAs or tracks that have no associated data and no associated storage location whereby column 220 for such one or more tracks may be null. Generally, the storage pool 240 may be a pool of memory from which portions may be allocated for use with the techniques herein. The data stored at a track or LBA or the source LUN 230 may also be stored in a location in memory as well as on the underlying physical storage provisioned for the source LUN 230 for use with the techniques herein.

Thus, in at least one embodiment, processing to initialize the table 200 may be performed as part of processing in order for a host to issue I/Os to the linked target LUN (e.g., that is bound to the snapshot of the source LUN). As noted above, in at least one embodiment, the initialization of table 200 may be performed responsive to binding, or more generally, exposing the snapshot of the source LUN as a target LUN to the host, whereby the host may subsequently issue I/Os to the target LUN (e.g., the snapshot of the source LUN). The processing performed to initialize the table 200 may be performed as a background operation, such as during periods of low utilization of the data storage system in connection with servicing I/O operations. In at least one embodiment, the table 200 may be initialized, by default, in consecutive sequential LBA or track ordering. For example, the table 200 may be initialized, whereby the ptr values in column 220 are determined in consecutive sequential order for all entries beginning with LBA or track 0 and ending with LBA or track N.

In at least one embodiment, the linked target LUN may be exposed to the host, and thus available for the host to issue I/O operations, prior to completing initialization of all entries of the table 200. In such an embodiment, if the host issues an I/O operation to a particular LBA or track for which initialization processing of its corresponding entry in the table 200 has not yet been completed, the data storage system may perform such initialization processing for that particular track's entry on demand and thus out of order. For example, assume only entry 202 for track 0 has been initialized and the host issues a read to read LBA or track N of the target LUN. The ptr. in column 220 for entry N of the table 200 has not yet been initialized. In this case, the default sequential initialization of entries of the table 200 may be interrupted to initialize entry 204 for LBA or track N and determine the storage location of the data for the LBA or track N of the target LUN. Once initialization for the LBA or track N, including initializing entry 204, has completed, initialization processing for remaining tracks of the target LUN may resume. For example, processing may then continue with initialization processing for LBA or track 1 of the target LUN and associated entry 203.

Figure 4C:
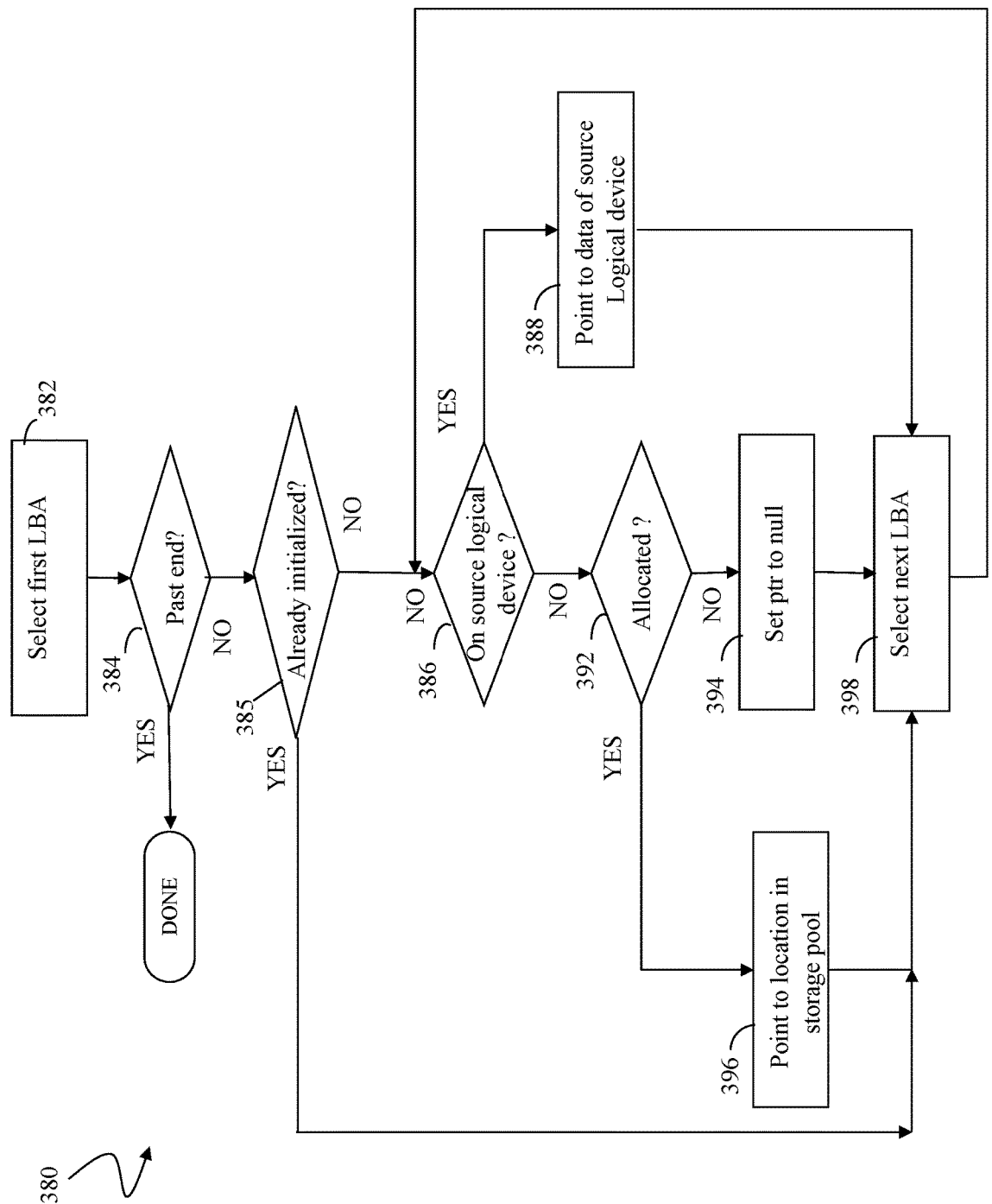
FIGS. 4C, 5D, 6A, 6B, 6C and 6D are flowcharts of processing steps that may be performed in an embodiment in accordance with the techniques herein.

Referring to FIG. 4C, a flowchart 380 illustrates processing performed in an embodiment in accordance with the techniques herein in connection with traversing undefined entries in a table for a linked target device or volume (like the table 200, discussed above) and causing the entries to be defined. The flowchart 380 outlines steps that may be performed in connection with a sequential traversal through the table 200 to initialize the table 200 and determine locations of data, if any, for each of the entries. The flowchart 380 may be performed responsive to linking or binding a snapshot of a logical device to a target logical device. The flowchart 380 processing may perform define processing and may be performed, for example, as a background processing task as noted elsewhere herein.

Processing begins at a first step 382 where an iteration counter is set to point to a first one of the entries in the table as the current entry. Following the step 382 is a test step 384 where it is determined if all of the entries in the table have been processed. If so, then processing is complete. Otherwise, control transfers from the step 384 to the step 385. At the step 385, a determination is made as to whether the current entry has already been initialized. Consistent with discussion herein, the flowchart 380 traverses sequentially through all entries in the table to perform any needed initialization and determine the location of the associated data, if any, for the entry. As also discussed elsewhere herein, it may be that entries of the table corresponding to LBAs of the linked target device identified using the hints are processed out of the sequential order or on demand. For example, such out of order or on demand processing to initialize a particular entry of the table for a particular LBA of the target LUN and define its associated storage location of data may be performed when an I/O is directed to the particular LBA and the entry associated with the particular LBA has not yet been initialized. Additionally, as also described in more detail elsewhere herein, an embodiment in accordance the techniques herein may perform such out of order or on demand processing (e.g., to initialize a particular entry of the table for a particular LBA of the target LUN and define its associated storage location of data may be performed) responsive to the data storage system receiving hints provided regarding I/Os directed to the particular LBA of the linked target device.

If the step 385 evaluates to yes, control proceeds to the step 398 to process the next entry. If the step 385 evaluates to no, control proceeds to the step 386 where it is determined if the data for the LBA corresponding to the entry indicated by the iteration counter is located on the source logical device 230.

If it is determined at the step 386 that the LBA corresponding to the entry indicated by the iteration counter is located on the source logical device, then control transfers from the test step 386 to a step 388, where the corresponding table entry has its ptr reference a location of data for the LBA of the source logical device 230. Otherwise, control transfers from the test step 386 to the step 392 where it is determined if the LBA corresponding to the entry indicated by the iteration counter is allocated. If not, then control transfers to a step 394 where the ptr of the corresponding entry in the table is set to null. Otherwise, control transfers to a step 396 where the ptr of the corresponding entry in the table is set to point to, or reference, a location in the storage pool 240 including the data. Following the step 396 is a step 398 where the iteration counter is incremented to advance to the next entry in the table. Note that the step 398 also follows the steps 388, 394. Following the step 398, control transfers back to the step 384 for a subsequent iteration.

Figure 5A:
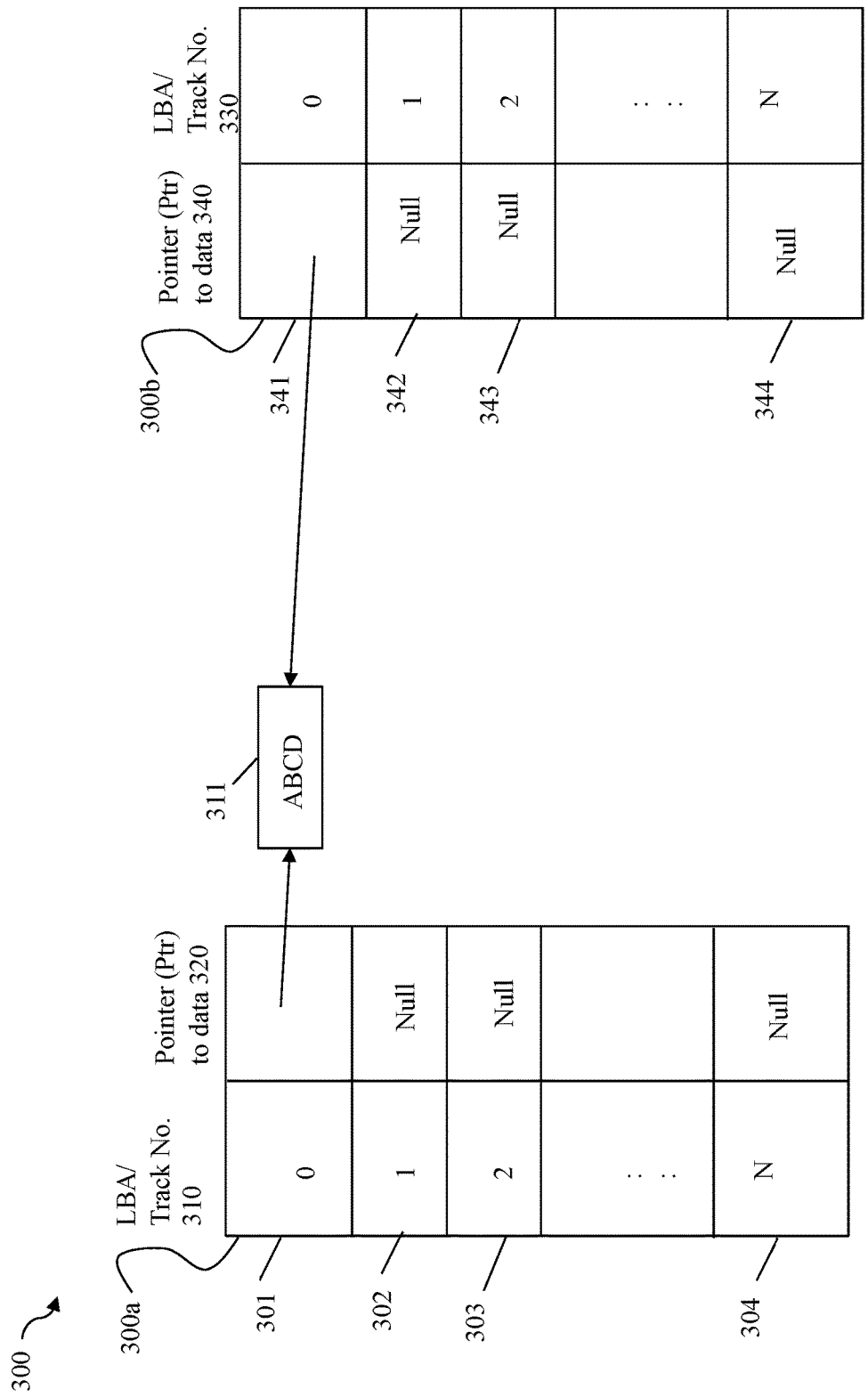
FIGS. 5A, 5B and 5C illustrate processing performed in connection with writing to a source logical device having a snapshot in an embodiment in accordance with the techniques herein.
Figure 5B:
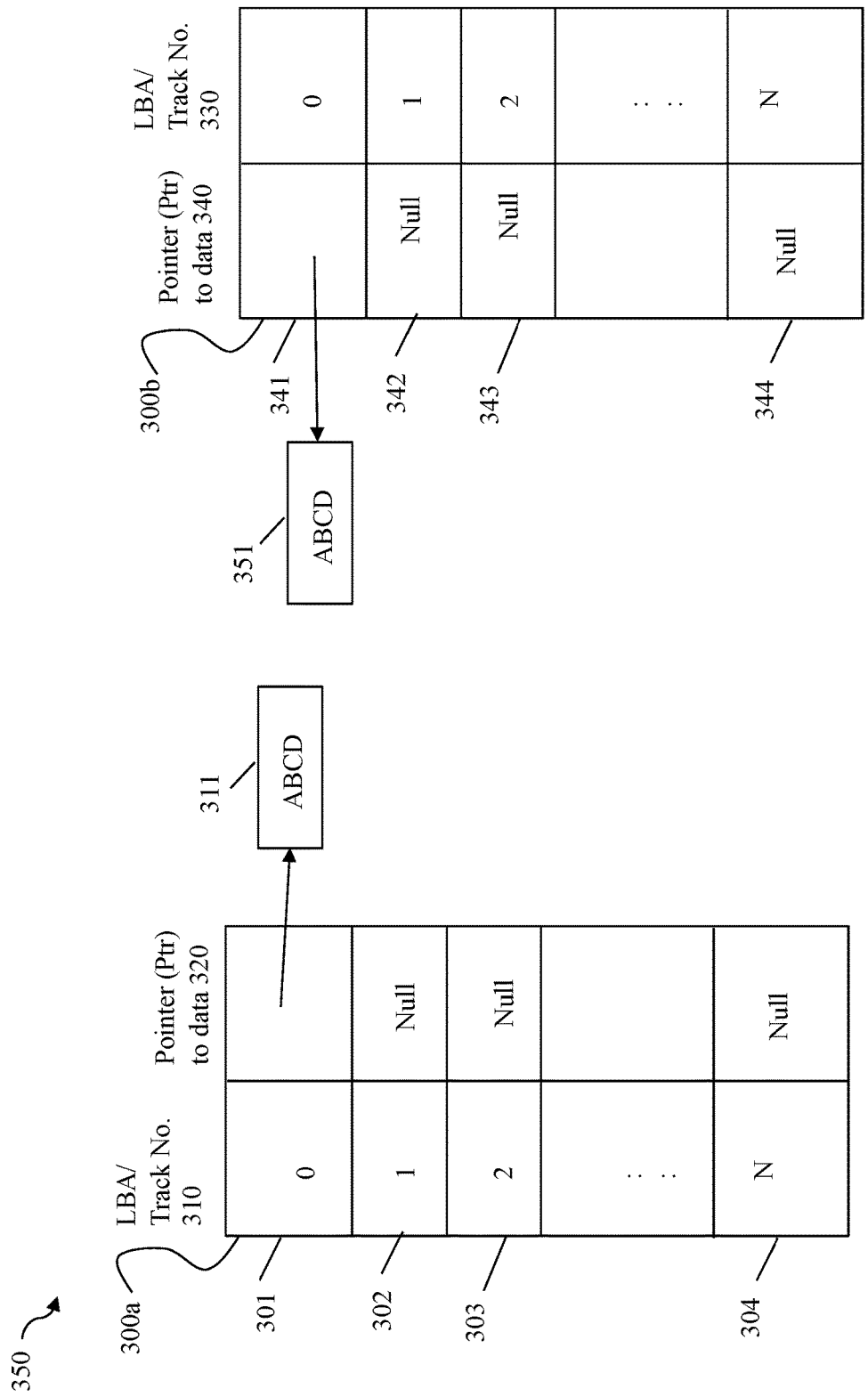
Figure 5C:
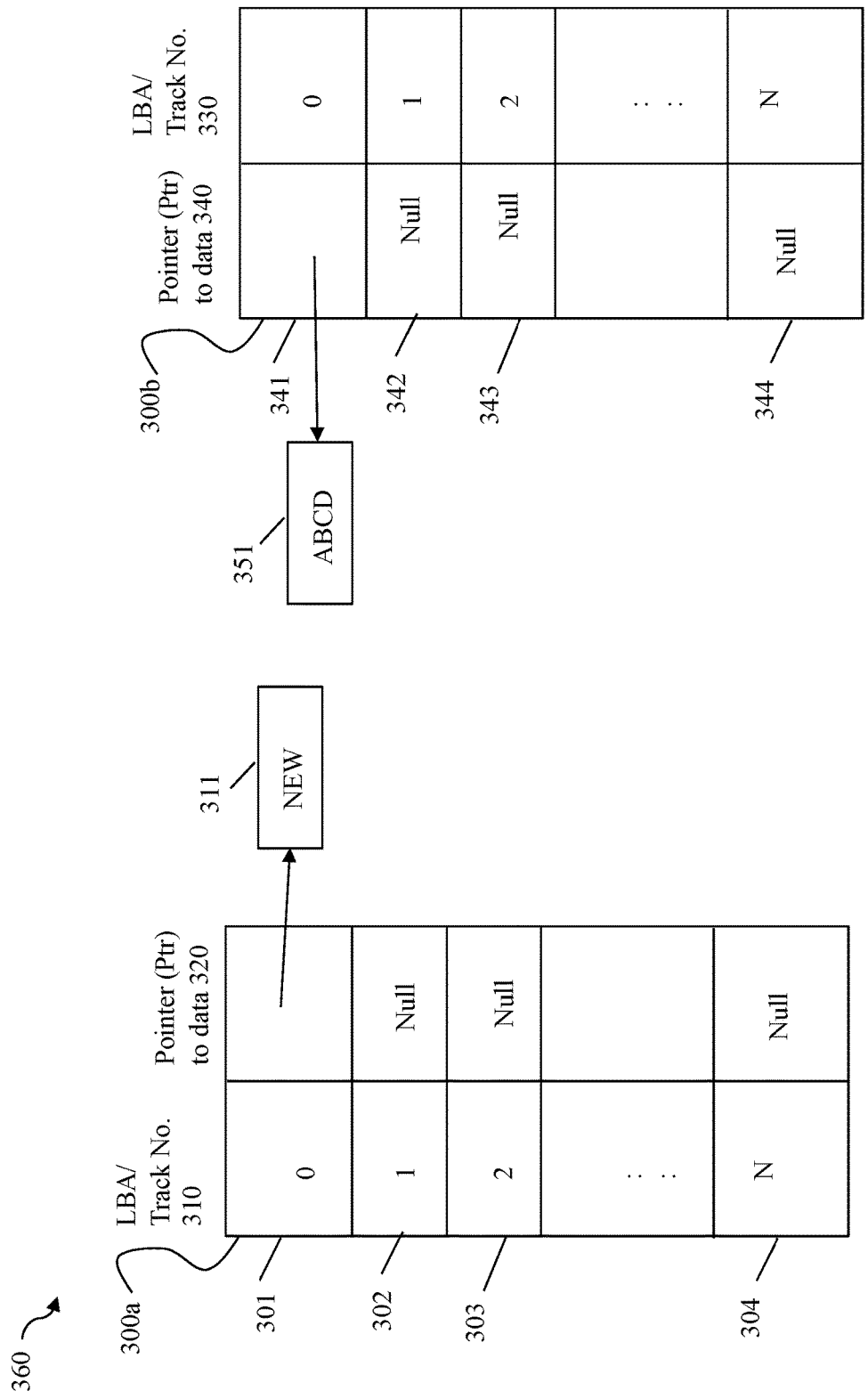

Referring to FIGS. 5A, 5B and 5C, shown are examples illustrating processing that may be performed in connection with servicing a write I/O directed to an LBA of the source device having one or more snapshots in order to maintain or preserve the existing data stored at the LBA of the source device, where such existing data is referenced by at least one of the snapshots of the source device. Such processing as described below in connection with FIGS. 5A-5C may be performed in an embodiment utilizing the COFW technique for snapshots.

In the FIG. 5A, shown is an example of a structure 300a that may be used for a source LUN and a structure 300b that may be used for a linked target LUN (e.g., linked to a snapshot of the source LUN) in connection with the techniques herein. The structures 300a and 300b denote logical representations of information that may be used in connection with identifying the location of data for each track or LBA, respectively, of the source LUN and linked target LUN. In this example, the source LUN having table 300a and the linked target LUN having table 300b are both TLUNs. The structures 300a and 300b may logically represent information similar to that as described in connection with the table of the example 200 of FIG. 4B.

In a first step as depicted in the example 300, both the source LUN and the linked target LUN have the same data stored on all corresponding LBAs. The example 300 may denote the state of the source LUN and linked target LUN immediately after the snapshot of the linked target LUN has been created whereby no further writes have been issued to the source LUN or the linked target LUN. As illustrated by the table 300a, the LBA or track 0 of the source LUN having entry 301 references data "ABCD" stored at the storage location 311. All other LBAs and track of the source LUN may be unallocated whereby corresponding remaining entries of the table 300a are all Null (e.g., as denoted by Null values in column 320). As illustrated by the table 300b, the LBA or track 0 of the linked target LUN having entry 341 references data "ABCD" stored at the storage location 311. All other LBAs and track of the linked target LUN may be unallocated whereby corresponding remaining entries of the table 300b are all Null (e.g., as denoted by Null values in column 330).

At a second point in time, a write that writes the content "NEW" to LBA or track 0 of the source LUN may be received. Responsive to receiving the write, processing may be performed to allocate a new storage location 351 and copy the data "ABCD" stored at LBA 0 of the source LUN to the new storage location 351 (e.g., copy data "ABCD" from 311 to 351). Additionally, as illustrated in the FIG. 5C, the write data "NEW" may now be stored in the location 311 referenced by the entry 301 for the LBA or track 0 of the source LUN's table 300a.

For completeness, it should be noted that generally a read and/or a write may be to a target device linked to a snapshot. For example, reference is made back to FIG. 5A. Rather than writing to the source LUN track or LBA 0, assume a write is issued to the linked target LUN track or LBA 0, where the write stores "NEXT" to track or LBA 0 of the linked target LUN track. In such a case, storage may be allocated from the storage pool, "NEXT" may be stored in the newly allocated storage, and the table 300b entry 341 may be updated to now reference the newly allocated storage including the newly written data "NEXT". If a second write writes "NEW" to track or LBA 1 of the linked target device, a second storage location from the storage pool may be allocated, the write data "NEW" of the second write may be stored at the second storage location, and entry 342 of the table 300b may be updated to reference the second storage location.

FIGS. 5A-5C illustrate processing that may typically be performed in an embodiment responsive to receiving a write operation in which the data storage system had not received a hint regarding the write I/O to LBA or track 0 of the source LUN. As described in more detail elsewhere, an embodiment in accordance with the techniques herein may have the MP driver of the host send a hint to the data storage system regarding the write operation to LBA or track 0 of the source LUN prior to the host actually sending the write operation to the data storage system. The hint may generally include information identifying the source logical device having one or more snapshots and may also identify one or more LBAs for which the host is subsequently expected to send an write I/O operation to the data storage system. In such an embodiment, responsive to receiving the hint, the data storage system may perform preprocessing for the write I/O operation directed to LBA or track 0 of the source LUN. The preprocessing may include, for example, performing processing as illustrated in FIG. 5B to allocate the new storage location 351 and copy the existing or current data "ABCD" from the storage location 311 to the new storage location 351. In this manner, when the write I/O to LBA or track 0 of the source LUN is actually received, the "NEW" write data may be written location 311 since the preprocessing for the write I/O operation already completed FIG. 5B processing. Performing such preprocessing for a write to an LBA or track of a source LUN means that the I/O response time incurred as part of the I/O or data path is reduced (e.g., by the amount of time it would have otherwise taken to performed FIG. 5B processing as part of the I/O or data path).

Figure 5D:
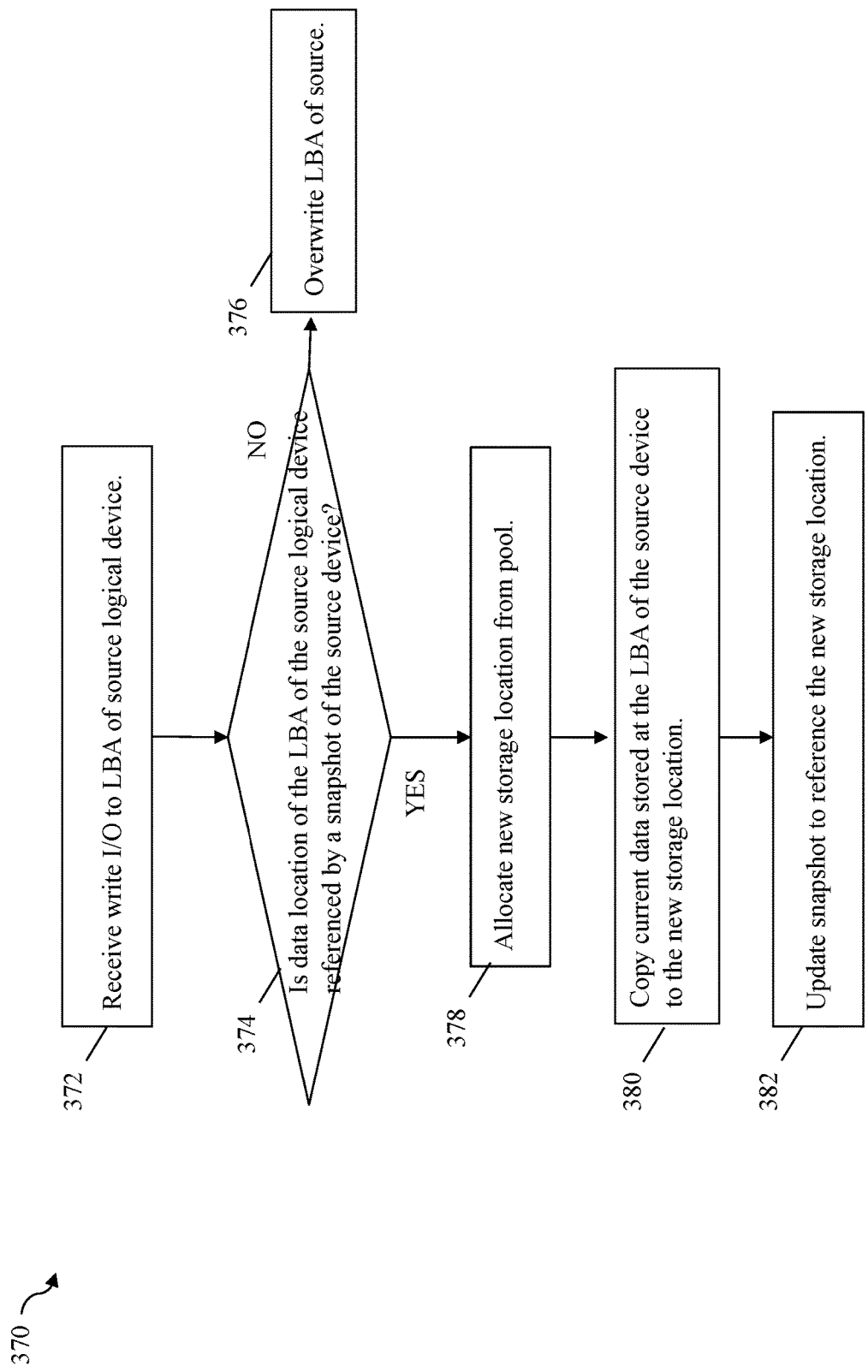

Referring to FIG. 5D, shown is a flowchart summarizing processing that may be performed in connection with a write I/O operation (directed to the source logical device having one or more snapshots) received at the data storage system. The flowchart 370 summarizes processing as described above for a COFW technique as illustrated in connection with FIGS. 5A-5C. The flowchart 370 illustrates the processing steps performed without the use of hints and preprocessing for the write. Consistent with discussion elsewhere of the techniques herein, use of the hints and preprocessing for writes directed to the source logical device having one or more snapshots provides for performing the steps 374, 378, 380 and 382 as part of the preprocessing prior to receiving the write to the source device having snapshots. The step 376 may be performed responsive to receiving the write as part of the I/O or data path.

At the step 372, a write I/O to an LBA or the source device having one or more snapshots is received. From the step 372, control proceeds to the step 374 where a determination is made as to whether the data location of the LBA of the source device is referenced by a snapshot of the source device (e.g., whether the source device and a snapshot of the source device have the same data). If the step 374 evaluates to no, control proceeds to the step 376 to overwrite the LBA of the source device with the new data of the write I/O. If the step 374 evaluates to yes, control proceeds to the step 378 to allocate a new storage location from the pool. From the step 378, control proceeds to the step 380 where the current data storage at the LBA of the source device is copied to the new storage location (allocated in step 378). From the step 380, control proceeds to the step 382 where processing updates the snapshot to reference the new storage location.

What will now be described are figures including flowcharts of processing that may be performed in an embodiment in accordance with the techniques herein. The flowcharts generally summarize processing discussed above and also include some additional steps that may be used to further optimize the techniques herein.

Figure 6A:
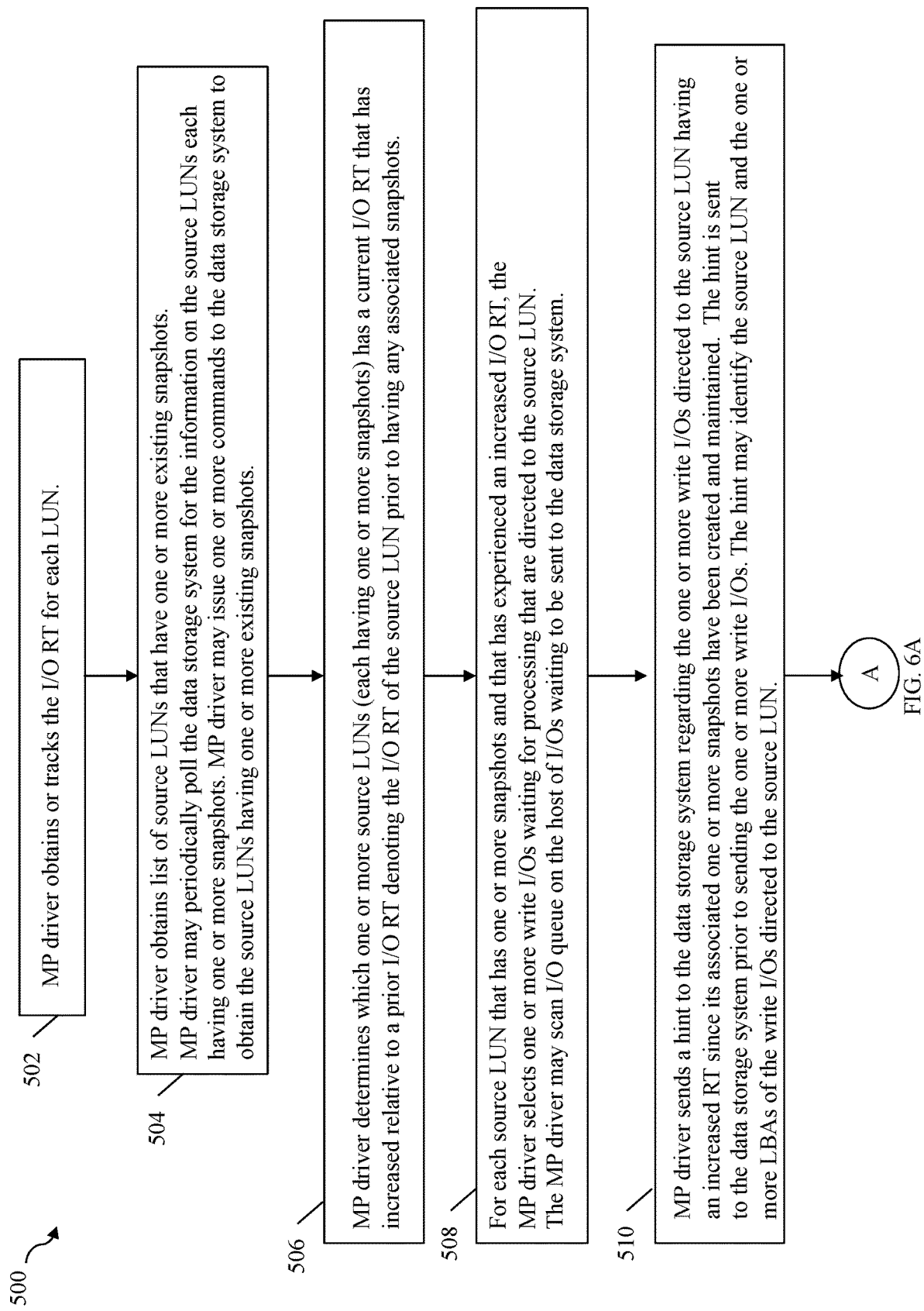
Figure 6B:
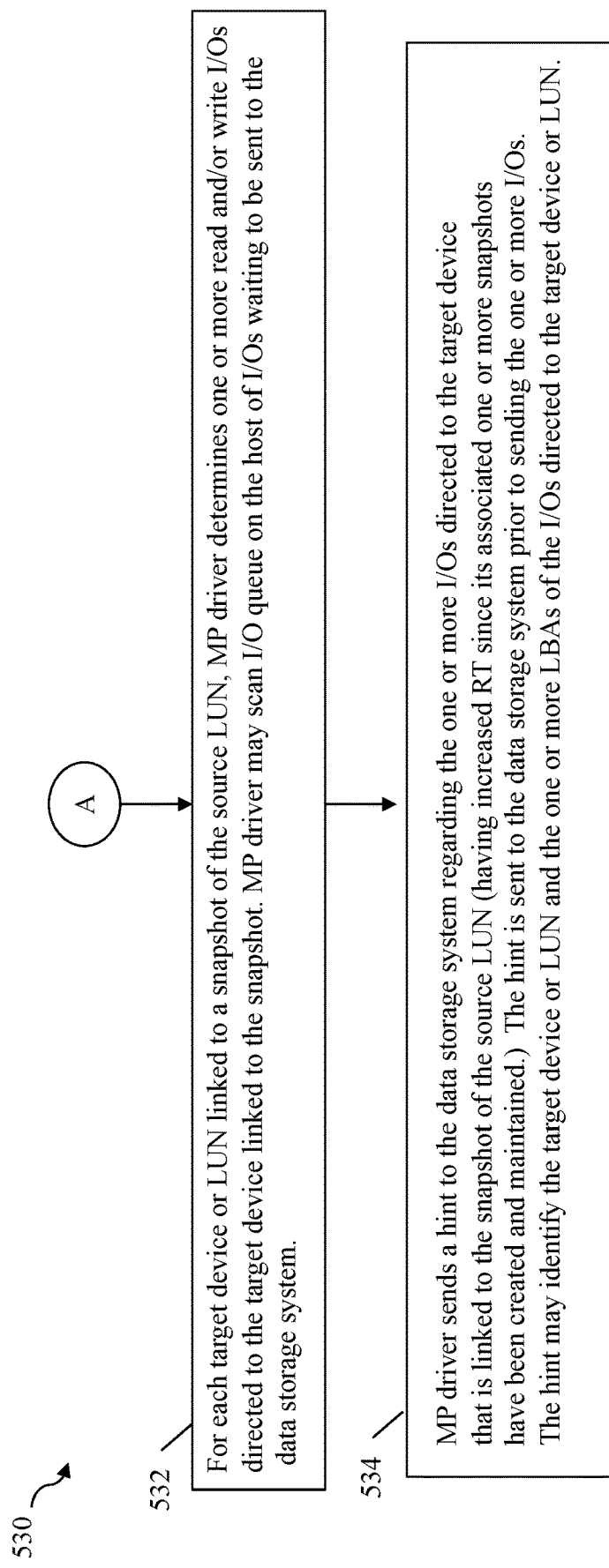

Referring to FIG. 6A, shown is the flowchart 500 summarizing processing that may be performed in at least one embodiment in accordance with the techniques herein by the MP driver of the host. At the step 502, the MP driver may obtain or track the I/O response time (RT) for each logical device to which the host sends I/Os. The MP driver may obtain or track the logical device I/O RTs using any suitable technique. For example, the MP driver may obtain information regarding the average I/O RT for a time period from the data storage system, by monitoring I/Os and associated RTs observed from the host, and the like. The step 502 may denote obtaining the I/O RTs for LUNs prior to, or without having, any snapshots created for any such LUNs.

From the step 502, processing proceeds to the step 504. At the step 504, the MP driver obtains a list of the source logical devices having one or more existing snapshots. The MP driver may periodically poll the data storage system for the information on the source logical devices having one or more snapshots. MP driver may issue one or more commands to the data storage system to obtain the list of the source logical devices having one or more existing snapshots. Such polling may be performed periodically to obtain updated information at various points in time regarding a current list of source logical devices having one or more snapshots.

In at least one embodiment operating in accordance with the SCSI standard, the inquiry command may be enhanced to include information denoting when a particular LUN or group of LUNs have one or more existing snapshot. In such an embodiment, the inquiry command may be issued periodically by the host to the data storage system. The data storage system may return a response to the command that denotes whether a particular LUN is a source LUN having one or more existing snapshots.

From the step 504, control proceeds to the step 506. In the step 506, the MP driver determines which one or more source logical devices, each having one or more snapshots, have a current I/O RT that has increased relative to a prior I/O RT denoting the I/O RT of the source logical device prior to having any associated snapshots. In other words, the steps 502, 504 and 506 provide for the MP driver tracking the source LUN I/O RT over time. If a source LUN has an increased I/O RT (e.g., increase by at least a threshold amount) once a snapshot has been created, the MP driver will send hints (as described in following steps) to the data storage system in connection with write LBA ranges for write I/Os directed to the source LUN. The steps 502, 504 and 506 may also be generally characterized as an optimization performed to determine a subset of all source LUNs each having one or more snapshots for which to perform hinting and preprocessing using the techniques herein. More generally, an embodiment may use any suitable technique to select a portion of the source LUNs (each having one or more snapshots) for which to perform hinting and preprocessing for source device writes and I/Os directed to target devices linked to snapshots of the source device. For example, an embodiment may allow a user to select one or more performance critical source LUNs each having one or more snapshots whereby hinting and preprocessing may be performed for such selected source LUNs.

From the step 506, processing proceeds to the step 508. At the step 508, for each source LUN that has one or more snapshots and that has experienced an increased I/O RT, the MP driver selects one or more write I/Os waiting for processing that are directed to the source LUN. The MP driver may scan one or more I/O queues on the host of I/Os waiting to be sent to the data storage system. The MP driver may select the one or more write I/Os from such host I/O queues. From the step 508, control proceeds to the step 510. At the step 510, the MP driver sends a hint to the data storage system regarding the one or more selected write I/Os directed to the source LUN having an increased RT since its associated one or more snapshots have been created and maintained. The hint is sent to the data storage system prior to sending the one or more write I/Os. The hint may identify the source LUN and the one or more LBAs of the write I/Os directed to the source LUN. The hint may indicate that the information is to be used in connection with preprocessing of write I/Os directed to the source LUN having one or more snapshots.

From the step 510, control proceeds to the step 532. At the step 532, for each target device or LUN linked to a snapshot of the source LUN, the MP driver determines one or more read and/or write I/Os directed to the target device linked to the snapshot. The MP driver may scan one or more I/O queues on the host of I/Os waiting to be sent to the data storage system. The MP driver may select the one or more read and/or write I/Os from such host I/O queues. From the step 532, control proceeds to the step 534. At the step 534, the MP driver sends a hint to the data storage system regarding the one or more I/Os directed to the target device that is linked to the snapshot of the source LUN (having increased RT since its associated one or more snapshots have been created and maintained.) The hint is sent to the data storage system prior to sending the one or more I/Os directed to the target device or LUN linked to a snapshot of a source device. The hint may identify the target device or LUN and the one or more LBAs of the I/Os directed to the target device or LUN. The hint may indicate that the information is to be used in connection with preprocessing of I/Os directed to the target device or LUN that is linked to a snapshot of a source LUN.

Generally, the steps 532 and 534 may be performed with respect to one of more target devices linked to a snapshot of a source device in the subset or portion of source devices identified in step 506. The hint information may be sent from the host to the data storage system in any suitable manner. For example, in at least one embodiment, a vendor unique SCSI command may be used to send the hint information from the MP driver of the host to the data storage system.

Generally, the hint information may be sent from the MP driver of the host to any selected target port of any selected FA director. In at least one embodiment, the hint information in the form of a vendor unique SCSI command may be sent to a particular FA director determined as the least busy FA director of the data storage system. In at least one embodiment, the MP driver may be tracking the relative level of busyness, or more generally, relative workload or utilization of the different FA directors of the data storage system. For example, the MP driver may also perform such tracking as part of workload balancing in connection with selecting which FA to direct host I/Os. The particular FA director selected may have additional processor time and resource to perform the requested preprocessing. The workload of the FAs of the data storage system may be determined using any suitable technique. In one embodiment, the MP driver may determine the relative workload or utilization of the different FAs by monitoring the queue depth of the queued pending, outstanding or in-progress I/Os already sent to particular target DS ports of the FAs. Queue depth may be defined as the number of entries or queued I/Os on the host where the I/O are directed to one of the target ports or FAs of the data storage system. Thus the queue depth denotes the number of I/Os for which the host is waiting for a response from a particular target port or FA. The longer the queue for a particular target port or FA, the busier or higher the workload of that target port or FA. In this manner, the hint may be sent to the target port or FA having the shortest queue of pending, outstanding or in-progress I/Os.

Figure 6C:
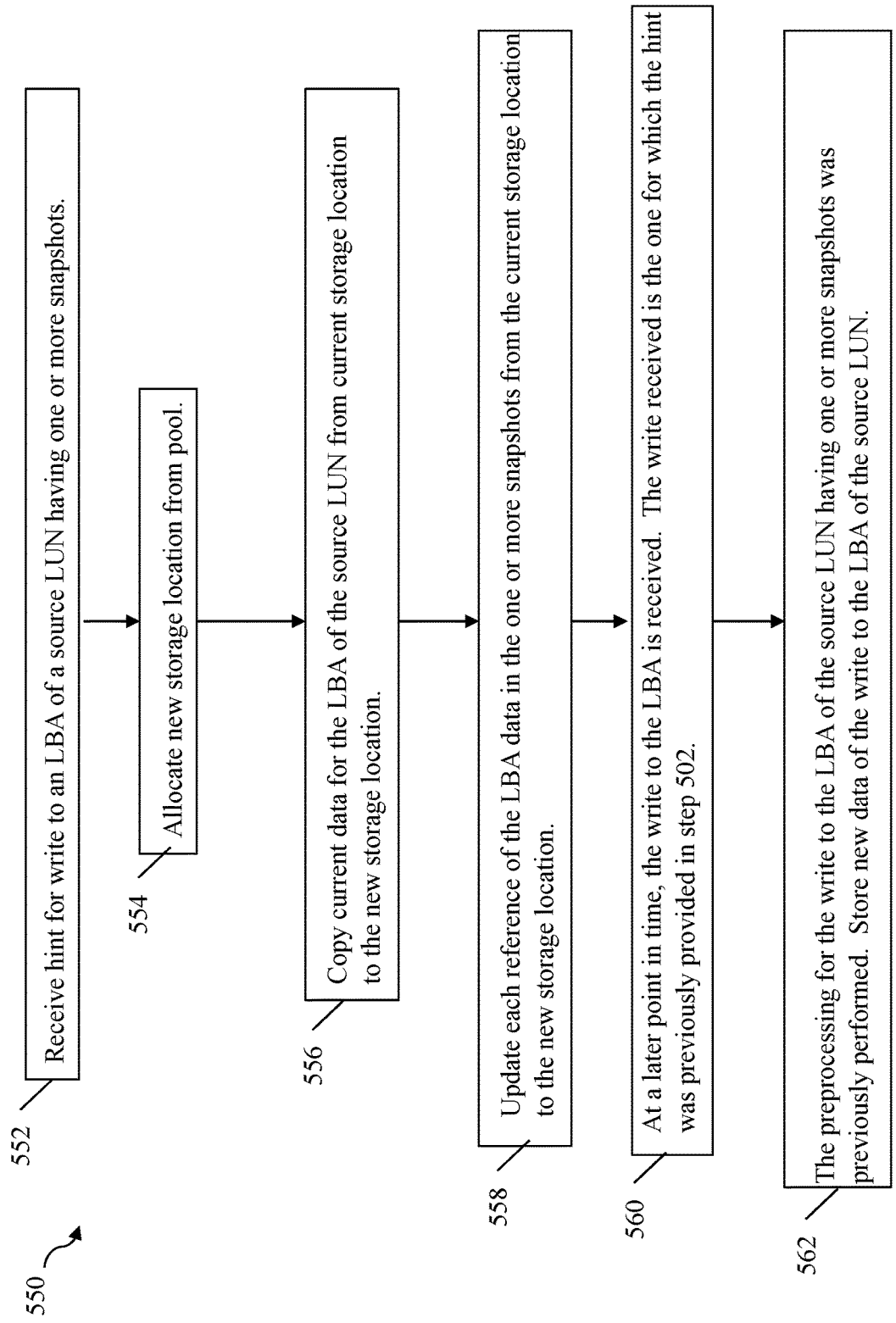

Referring to FIG. 6C, shown is a flowchart 550 that may be performed in an embodiment in accordance with the techniques herein by the data storage system. The flowchart 550 may be performed in connection with processing hints received for writes directed to an LBA of a source logical device having one or more snapshots.

At the step 552, a hint is received at the data storage system for a write to an LBA of a source LUN having one or more snapshots. The hint identifies the LBA and the source LUN. From the step 552, control proceeds to the step 554 where a new storage location is allocated from the pool. From the step 554, control proceeds to the step 556. At the step 556, processing is performed to copy the current data for the LBA of the source LUN from a current storage location to the new storage location. From the step 556, processing proceeds to the step 558. At the step 558, processing is performed to update each reference of the LBA data in the one or more snapshots of the source LUN from the current storage location to the new storage location. From the step 558, control proceeds to the step 560. At the step 560, at a later point in time such as subsequent to the step 558, the write to the LBA is received from the host at the data storage system. The write received is the one for which the hint was previously provided in step 502. From the step 560, control proceeds to the step 562. At the step 562, the new data of the write is written to the LBA of the source LUN. The preprocessing for the write to the LBA of the source LUN having one or more snapshots was previously performed in steps 554, 556 and 558 whereby now in the step 562, such steps are not performed and the new write data may be written to the LBA of the source LUN.

Figure 6D:
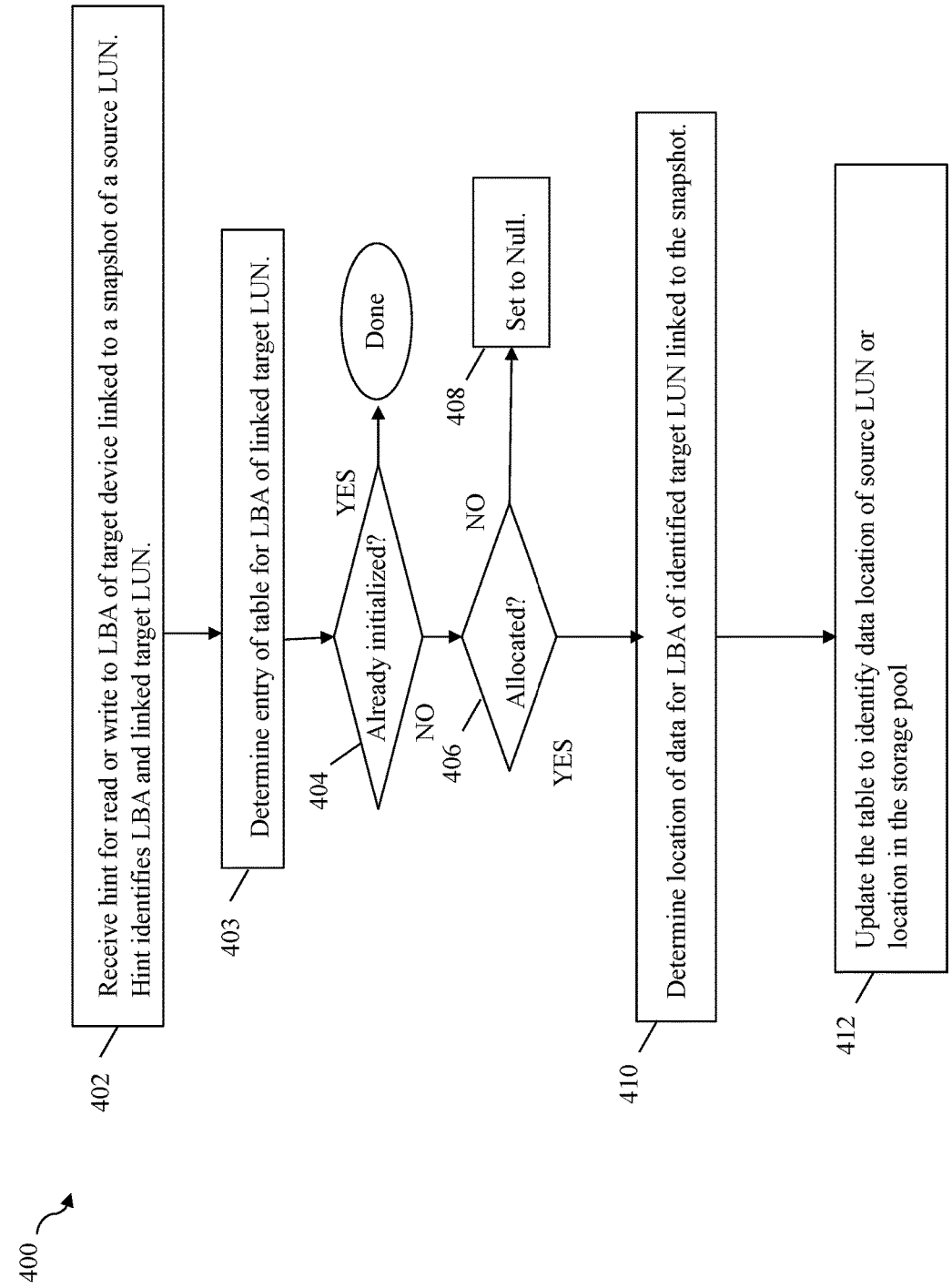

Referring to FIG. 6D, shown is a flowchart 400 of processing steps that may be performed in connection with processing hints for I/Os directed to a linked target LUN or device (e.g., logical device linked to a snapshot of a source LUN) in an embodiment in accordance with the techniques herein. The flowchart 400 outlines processing that may be performed in connection with an out of order or on demand initialization of an entry of the table 200. The entry is out of order with respect to the sequential traversal and initialization of entries performed by the flowchart of FIG. 4C.

At the step 402, a hint for a read or write to an LBA of a linked target LUN is received at the data storage system from the host. The hint may identify the LBA and the linked target LUN bound to a snapshot of a source LUN. From the step 402, processing proceeds to the step 403 where the entry of the table for the LBA of the linked target LUN is determined. From the step 403, control proceeds to the step 404.

At the step 404, a determination is made as to whether the entry has already been initialized. If the step 404 evaluates to yes, then processing for the hint is complete. If the step 404 evaluates to no, control proceeds to the step 406 where a determination is made as to whether storage for the LBA associated with the entry has been allocated. The step 406 evaluates to no in cases where the LBA has not been written to and the target LUN is a TLUN. The step 406 evaluates to yes in cases where the LBA has been written to and the target LUN is a TLUN.

If the step 406 evaluates to no, control proceeds to step 408 to set the ptr of the entry to null. If the step 406 evaluates to yes, control proceeds to the step 410 where the location of the data for the LBA of the target LUN linked to the snapshot is determined. From the step 410, control proceeds to the step 412 where the entry is updated to point to or reference the location of the data for the associated LBA as either a location for data of a corresponding LBA of the source logical device 230 or a location in the storage pool 240.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
 selecting a logical device having at least one snapshot on a data storage system;
 sending, from a host to the data storage system, a first hint for a first write I/O operation directed to a first location on the logical device, wherein said sending the first hint is performed prior to the host sending the first write I/O operation to the data storage system; and
 responsive to receiving the first hint regarding the first write I/O operation to the first location of the logical device having at least one snapshot, performing preprocessing for the first write I/O operation, wherein the host sends I/Os to a plurality of front end directors of the data storage system and the first hint is sent to a first of the plurality of front end directors, wherein the first front end director has a lowest relative workload of the plurality of front end directors.

2. The method of claim 1, wherein the host determines relative workloads of the plurality of front end directors in accordance with outstanding or pending I/Os issued from the host to the plurality of front end directors.

3. A method of processing I/O operations comprising:
 selecting a logical device having at least one snapshot on a data storage system;
 sending, from a host to the data storage system, a first hint for a first write I/O operation directed to a first location on the logical device, wherein said sending the first hint is performed prior to the host sending the first write I/O operation to the data storage system; and
 responsive to receiving the first hint regarding the first write I/O operation to the first location of the logical device having at least one snapshot, performing preprocessing for the first write I/O operation, wherein first data is stored at the first location of the logical device, and a first snapshot of the logical device references the first data, and wherein the preprocessing for the first write I/O operation includes:
 allocating a new storage portion;
 copying the first data to the new storage location; and
 updating the first snapshot to reference the new storage location.

4. The method of claim 3, further comprising:
 sending the first write I/O operation from the host to the data storage system after sending the first hint from the host to the data storage system.

5. The method of claim 4, wherein the first write I/O operation writes second data, and the method further comprises:
 responsive to receiving the first write I/O operation, storing the second data at the first location of the logical device.

6. A method of processing I/O operations comprising:
 selecting a logical device having at least one snapshot on a data storage system;
 sending, from a host to the data storage system, a first hint for a first write I/O operation directed to a first location on the logical device, wherein said sending the first hint is performed prior to the host sending the first write I/O operation to the data storage system; and
 responsive to receiving the first hint regarding the first write I/O operation to the first location of the logical device having at least one snapshot, performing preprocessing for the first write I/O operation, wherein first data is stored at the first location of the logical device, and a first snapshot of the logical device references the first data, and wherein the first snapshot is linked to a second logical device exposed to the host.

7. The method of claim 6, further comprising:
 sending, from the host to the data storage system, a second hint for a second I/O operation directed to a second location on the second logical device, wherein said sending the second hint is performed prior to the host sending the second I/O operation to the data storage system; and responsive to receiving the second hint regarding the second I/O operation to the second location of the second logical device linked to the first snapshot, performing second preprocessing for the second I/O operation.

8. The method of claim 7, wherein the second I/O operation is any of a read and write operation.

9. The method of claim 7, wherein a structure associated with the second logical device includes a plurality of entries for a plurality of corresponding logical locations of the second logical device, wherein the structure references data stored at the logical locations of the second logical device, and wherein the second preprocessing for the second I/O operation includes:

determining a first entry of the table corresponding to the second location of the second logical device; and updating the first entry of the table to reference data currently stored at the second location of the second logical device.

10. The method of claim 9, wherein said updating includes:

determining whether data of the second location of the second logical device is located on the logical device or a storage location in a storage pool.

11. The method of claim 10, wherein each of the second logical device and the logical device is a different thin logical device that is virtually provisioned.

12. The method of claim 11, wherein said updating includes:

determining whether allocated storage is associated with the second location of the second logical device; and responsive to determining that allocated storage is not associated with the second location of the second logical device, updating the first entry to denote a null value as a reference to data stored at the second location of the second logical device.

13. The method of claim 12, further comprising:

sending the second I/O operation from the host to the data storage system after sending the second hint from the host to the data storage system.

14. The method of claim 13, wherein the second I/O operation writes new data to the second location of the second logical device, and the method further comprises:

responsive to receiving the second I/O operation, performing first processing that stores the new data at the second location of the second logical device.

15. The method of claim 13, wherein the second I/O operation reads data from the second location of the second logical device, and the method further comprises:

responsive to receiving the second I/O operation, performing first processing that reads current data stored at the second location of the second logical device.

16. The method of claim 1, further comprising: A method of processing I/O operations comprising:

selecting a logical device having at least one snapshot on a data storage system;

sending, from a host to the data storage system, a first hint for a first write I/O operation directed to a first location on the logical device, wherein said sending the first hint is performed prior to the host sending the first write I/O operation to the data storage system; and responsive to receiving the first hint regarding the first write I/O operation to the first location of the logical device having at least one snapshot, performing preprocessing for the first write I/O operation, and wherein the method further includes:

determining that the logical device having at least one snapshot on the data storage system has a current I/O response time that has increased relative to a second I/O response time for I/Os directed to the logical device when the logical device had no associated snapshots.

17. A system comprising:

one or more processors; and a memory comprising code stored thereon that, when executed by the one or more processors, performs a method of processing I/O operations comprising:

selecting a logical device having at least one snapshot on a data storage system;

sending, from a host to the data storage system, a first hint for a first write I/O operation directed to a first location on the logical device, wherein said sending the first hint is performed prior to the host sending the first write I/O operation to the data storage system; and responsive to receiving the first hint regarding the first write I/O operation to the first location of the logical device having at least one snapshot, performing preprocessing for the first write I/O operation, wherein the host sends I/Os to a plurality of front end directors of the data storage system and the first hint is sent to a first of the plurality of front end directors, wherein the first front end director has a lowest relative workload of the plurality of front end directors.

18. A non-transitory computer readable medium comprising code stored thereon that, when executed, performs a method of processing I/O operations comprising:

selecting a logical device having at least one snapshot on a data storage system;

sending, from a host to the data storage system, a first hint for a first write I/O operation directed to a first location on the logical device, wherein said sending the first hint is performed prior to the host sending the first write I/O operation to the data storage system; and responsive to receiving the first hint regarding the first write I/O operation to the first location of the logical device having at least one snapshot, performing preprocessing for the first write I/O operation, wherein the host sends I/Os to a plurality of front end directors of the data storage system and the first hint is sent to a first of the plurality of front end directors, wherein the first front end director has a lowest relative workload of the plurality of front end directors.

19. A system comprising:

one or more processors; and a memory comprising code stored thereon that, when executed by the one or more processors, performs a method of processing I/O operations comprising:

selecting a logical device having at least one snapshot on a data storage system;

sending, from a host to the data storage system, a first hint for a first write I/O operation directed to a first location on the logical device, wherein said sending the first hint is performed prior to the host sending the first write I/O operation to the data storage system; and responsive to receiving the first hint regarding the first write I/O operation to the first location of the logical device having at least one snapshot, performing preprocessing for the first write I/O operation, wherein first data is stored at the first location of the logical device, and a first snapshot of the logical device references the first data, and wherein the preprocessing for the first write I/O operation includes:
allocating a new storage portion;
copying the first data to the new storage location; and
updating the first snapshot to reference the new storage location.

20. A non-transitory computer readable medium comprising code stored thereon that, when executed, performs a method of processing I/O operations comprising:
selecting a logical device having at least one snapshot on a data storage system;
sending, from a host to the data storage system, a first hint for a first write I/O operation directed to a first location on the logical device, wherein said sending the first hint is performed prior to the host sending the first write I/O operation to the data storage system; and
responsive to receiving the first hint regarding the first write I/O operation to the first location of the logical device having at least one snapshot, performing preprocessing for the first write I/O operation, wherein first data is stored at the first location of the logical device, and a first snapshot of the logical device references the first data, and wherein the preprocessing for the first write I/O operation includes:
allocating a new storage portion;
copying the first data to the new storage location; and
updating the first snapshot to reference the new storage location.

21. A system comprising:
one or more processors; and
a memory comprising code stored thereon that, when executed by the one or more processors, performs a method of processing I/O operations comprising:
selecting a logical device having at least one snapshot on a data storage system;
sending, from a host to the data storage system, a first hint for a first write I/O operation directed to a first location on the logical device, wherein said sending the first hint is performed prior to the host sending the first write I/O operation to the data storage system; and
responsive to receiving the first hint regarding the first write I/O operation to the first location of the logical device having at least one snapshot, performing preprocessing for the first write I/O operation, wherein first data is stored at the first location of the logical device, and a first snapshot of the logical device references the first data, and wherein the first snapshot is linked to a second logical device exposed to the host.

22. A non-transitory computer readable medium comprising code stored thereon that, when executed, performs a method of processing I/O operations comprising:
selecting a logical device having at least one snapshot on a data storage system;
sending, from a host to the data storage system, a first hint for a first write I/O operation directed to a first location on the logical device, wherein said sending the first hint is performed prior to the host sending the first write I/O operation to the data storage system; and
responsive to receiving the first hint regarding the first write I/O operation to the first location of the logical device having at least one snapshot, performing preprocessing for the first write I/O operation, wherein first data is stored at the first location of the logical device, and a first snapshot of the logical device references the first data, and wherein the first snapshot is linked to a second logical device exposed to the host.

23. A system comprising:
one or more processors; and
a memory comprising code stored thereon that, when executed by the one or more processors, performs a method of processing I/O operations comprising:
selecting a logical device having at least one snapshot on a data storage system;
sending, from a host to the data storage system, a first hint for a first write I/O operation directed to a first location on the logical device, wherein said sending the first hint is performed prior to the host sending the first write I/O operation to the data storage system; and
responsive to receiving the first hint regarding the first write I/O operation to the first location of the logical device having at least one snapshot, performing preprocessing for the first write I/O operation, and wherein the method further includes:
determining that the logical device having at least one snapshot on the data storage system has a current I/O response time that has increased relative to a second I/O response time for I/Os directed to the logical device when the logical device had no associated snapshots.

24. A non-transitory computer readable medium comprising code stored thereon that, when executed, performs a method of processing I/O operations comprising:
selecting a logical device having at least one snapshot on a data storage system;
sending, from a host to the data storage system, a first hint for a first write I/O operation directed to a first location on the logical device, wherein said sending the first hint is performed prior to the host sending the first write I/O operation to the data storage system; and
responsive to receiving the first hint regarding the first write I/O operation to the first location of the logical device having at least one snapshot, performing preprocessing for the first write I/O operation, and wherein the method further includes:
determining that the logical device having at least one snapshot on the data storage system has a current I/O response time that has increased relative to a second I/O response time for I/Os directed to the logical device when the logical device had no associated snapshots.

* * * * *